US008842887B2

(12) United States Patent
Beatson et al.

(10) Patent No.: US 8,842,887 B2
(45) Date of Patent: Sep. 23, 2014

(54) METHOD AND SYSTEM FOR COMBINING A PIN AND A BIOMETRIC SAMPLE TO PROVIDE TEMPLATE ENCRYPTION AND A TRUSTED STAND-ALONE COMPUTING DEVICE

(76) Inventors: Rodney Beatson, Pittsboro, NC (US);
Mark A. Kelty, Catonsville, MD (US);
Christopher J. Beatson, Cary, NC (US)

( * ) Notice: Subject to any disclaimer, the term of this patent is extended or adjusted under 35 U.S.C. 154(b) by 906 days.

(21) Appl. No.: 12/931,340

(22) Filed: Jan. 31, 2011

(65) Prior Publication Data

US 2011/0126024 A1 May 26, 2011

Related U.S. Application Data

(63) Continuation-in-part of application No. 12/627,413, filed on Nov. 30, 2009, now Pat. No. 7,916,907, which is a continuation of application No. 11/151,412, filed on Jun. 14, 2005, now abandoned.

(60) Provisional application No. 60/579,422, filed on Jun. 14, 2004, provisional application No. 61/456,901, filed on Nov. 15, 2010.

(51) Int. Cl.
*G06K 9/00* (2006.01)
*G06K 9/32* (2006.01)
*H04L 9/32* (2006.01)
*G06F 21/32* (2013.01)

(52) U.S. Cl.
CPC .......... *G06K 9/00187* (2013.01); *G06K 9/3283* (2013.01); *G06F 2221/2129* (2013.01); *H04L 9/3242* (2013.01); *H04L 9/3231* (2013.01); *H04L 9/3226* (2013.01); *H04L 2209/16* (2013.01); *G06F 21/32* (2013.01)
USPC ............ 382/115; 382/119; 382/124; 382/209

(58) Field of Classification Search
USPC .......... 382/115, 119, 124, 209; 713/182, 184, 713/186
See application file for complete search history.

(56) References Cited

U.S. PATENT DOCUMENTS 5,150,420 A 9/1992 Haraguchi
5,339,361 A 8/1994 Schwalm et al.

(Continued)

FOREIGN PATENT DOCUMENTS

CA 2 333 864 A1 3/2001
JP 06243296 A 9/1994

(Continued)

OTHER PUBLICATIONS

U.S. Appl. No. 60/802,684, filed May 23, 2006, Rodney Beatson.

(Continued)

*Primary Examiner* — Matthew Bella
*Assistant Examiner* — Julian Brooks

(57) ABSTRACT

Biometric data, suitably transformed are obtained from a biometric input device contained within a stand-alone computing device and used in conjunction with a PIN to authenticate the user to the device. The biometric template and other data residing on the device are encrypted using hardware elements of the device, the PIN and Password hash. A stored obfuscated password is de-obfuscated and released to the device authentication mechanism in response to a successfully decrypted template and matching biometric sample and PIN. The de-obfuscated password is used to authenticate the user to device, the user to a remote computer, and to encrypt device data at rest on the device and in transit to and from the remote computer. This creates a trusted relationship between the stand-alone device and the remote computer. The system also eliminates the need for the user to remember and enter complex passwords on the device.

17 Claims, 5 Drawing Sheets

Stand-Alone Mobile
Component of a Trusted
Computer System

Remote Computer
System

(56) References Cited

U.S. PATENT DOCUMENTS

| | | | |
|---|---|---|---|
| 5,559,895 | A | 9/1996 | Lee et al. |
| 5,680,470 | A | 10/1997 | Moussa et al. |
| 5,712,912 | A | 1/1998 | Tomko et al. |
| 5,774,525 | A | 6/1998 | Kanevsky et al. |
| 5,892,824 | A | 4/1999 | Beatson et al. |
| 5,987,232 | A | 11/1999 | Tabuki |
| 6,091,835 | A | 7/2000 | Smithies et al. |
| 6,185,683 | B1 | 2/2001 | Ginter et al. |
| 6,219,794 | B1 | 4/2001 | Soutar et al. |
| 6,317,834 | B1 | 11/2001 | Gennaro et al. |
| 6,381,344 | B1 | 4/2002 | Smithies et al. |
| 6,512,525 | B1 | 1/2003 | Capps et al. |
| 6,957,339 | B2* | 10/2005 | Shinzaki ............... 713/186 |
| 7,010,694 | B2 | 3/2006 | Vatanen |
| 7,711,152 | B1* | 5/2010 | Davida et al. ............. 382/115 |
| 8,171,298 | B2* | 5/2012 | Ramaswamy et al. ...... 713/182 |
| 8,325,994 | B2* | 12/2012 | Davida ............... 382/115 |
| 8,738,925 | B1* | 5/2014 | Park et al. ............... 713/186 |
| 2002/0129285 | A1* | 9/2002 | Kuwata et al. ............ 713/202 |
| 2002/0150241 | A1 | 10/2002 | Scheidt et al. |
| 2002/0186838 | A1 | 12/2002 | Brandys |
| 2003/0056100 | A1 | 3/2003 | Beatson |
| 2003/0115475 | A1 | 6/2003 | Russo et al. |
| 2003/0135740 | A1 | 7/2003 | Talmor et al. |
| 2005/0138392 | A1 | 6/2005 | Johnson et al. |
| 2005/0160277 | A1 | 7/2005 | Sciupac |
| 2006/0226951 | A1 | 10/2006 | Aull et al. |
| 2006/0245619 | A1 | 11/2006 | Sathath |
| 2007/0038863 | A1 | 2/2007 | Nguyen |
| 2007/0050303 | A1 | 3/2007 | Schroeder et al. |

FOREIGN PATENT DOCUMENTS

| | | |
|---|---|---|
| WO | WO 01/88859 A3 | 11/2001 |
| WO | WO 02/054341 A1 | 7/2002 |
| WO | WO 03/065639 A2 | 8/2003 |
| WO | WO 2004/006495 A1 | 1/2004 |

OTHER PUBLICATIONS

Rodney Beatson—"Transaction Security, Inc. Unveils Crypto-Sign(TM) Biometric Software for the Mobile Work Force"—Press release through Newswire May 27, 2003.

Rodney Beatson—"The Use of Electronic Signatures at Point of Service"—Smart card 96 Conference in London, England, Feb. 1996.

Beatson, Rodney—Feature Selection & Definition in a Biometric System with Many Possible Features Including Multi-Modal features—TSI White Paper—Feb. 8, 2010.

INCITS M1 Biometrics Committee—ANSI INCITS 358-2002—BioAPI Specification—2002.

Taekyoung Kwon & Jae-Il Lee—Practical Digital Signature Generation Using Biometrics—LNCS (Lecture Notes in Computer Science) vol. 3043 pp. 728-737, May 2004.

Soutar et al.—Biometric Encryption—ICSA Guide to Cryptography, McGraw Hill, 1999.

INCITS M1 Study Group—Biometrics in E-Authentication—M1 Docunment No. m1070185rev Mar. 30, 2007.

Beatson Rodney, Transaction Security, Inc—Contribution to Biometrics in E Authetication Study INCITS M1 Document No. m1060495—May 24, 2006.

* cited by examiner

Figure 1A
Stand-Alone Mobile
Component of a Trusted
Computer System

Figure 1B - Remote Computer System

Figure 2A
Secure Mobile Computer – PIN plus Biometric Match
Process Flow - Registration & Enrolment Figure 2B – Process Flow
PIN plus Biometric Match – Local
Authentication Figure 3 – Process Flow
PIN plus Biometric Match
Secure Communications Mode

METHOD AND SYSTEM FOR COMBINING A PIN AND A BIOMETRIC SAMPLE TO PROVIDE TEMPLATE ENCRYPTION AND A TRUSTED STAND-ALONE COMPUTING DEVICE

RELATED APPLICATION DATA

This application is a Continuation-In-Part of U.S. patent application Ser. No. 12/627,413, filed 30 Nov. 2009, which in turn was a Continuation of U.S. patent application Ser. No. 11/151,412, filed 14 Jun. 2005, which is based on U.S. Provisional patent application No. 60/579,422, filed 14 Jun. 2004. The application is also based on Provisional Application No. 61/456,901, filed 15 Nov. 2010

BACKGROUND TO THE INVENTION

1. Field of Invention

The invention described herein is related to using biometric data samples, user knowledge of secret numbers, and device hardware ID data with encryption in a cooperative manner to authenticate device users to the stand-alone computing devices, to enable these devices to store secure encrypted biometric templates and to provide the basis for them to be accepted as trusted computing devices to remote computers or servers without the need for the user to remember and enter complex passwords. The invention is described mainly in the context of biometric data, and particularly signature/sign data, which is rotated to a consistent angle of inclination prior to feature extraction according to the above mentioned patent application Ser. No. 12/627,413 and it is applicable to any image-based biometric modality.

2. Description of the Prior Art

Today, there are many stand-alone computing devices in operation, all of which contain much sensitive, private and/or confidential information which is at risk in the event the device is lost or stolen. Devices in this category include, but are not limited to Cell Phones, iPads, PDA's, Tablet PC's, laptops and other mobile computing devices. There has been unprecedented growth in (finger) touch sensitive devices sparked by recent introductions of the iPhone, Android devices, the iPad and Windows Phone 7, which use capacitive screens for finger input. These devices are very attractive consumer devices and consequently, there is more pressure than ever for Enterprises to allow them to connect to corporate networks, particularly for email and cell phone use and for banks to allow them to be used as on-line payment instruments Connection to corporate networks for other purposes than email is allowed by some enterprises, whereas other enterprises choose not to allow such access because of the security risks involved—Is the device user really the device owner? The data accessible to these device users (owners or not) contain, at least, highly confidential personal information, which could be used for financial payment card fraud, identity theft or for other nefarious purposes and, in other cases, confidential personal and corporate data which could be highly detrimental to the corporate entity if it came into the public domain. For government workers and the military, if these devices fall into enemy hands or into the hands of foreign Governments and they do not have suitable protection the devices can be detrimental to National Security Most of these devices, if they are protected at all, rely upon the submission of a password, or just a simple PIN to gain access to the device. The PIN, on its own, although relatively user friendly, is very insecure. It can be passed on, guessed, overseen at entry, or generated through a brute force attack (an automated attack based upon submitting sequential PIN values until the correct one is found). Depending upon the password, this too can be insecure for the same reasons. If the password is sufficiently complex to provide sufficient security (e.g. a regularly-changing, randomly-chosen eight-character string consisting of lower case, upper case, numeric and special characters) the password becomes difficult to remember and enter on these devices and is very user unfriendly. As a result of the inherent lack of security associated with the devices many of them are not allowed to connect to their enterprise networks and this severely restricts their usefulness.

Over the last ten years or so and particularly since 9/11 there has come a realization that authentication systems based upon password entry at the keyboard are particularly vulnerable to unauthorized and unfettered access from many different sources. This despite increasingly sophisticated encryption methods and algorithms. The science of Biometrics, which captures samples of biological properties or behavioral characteristics of individuals, extracts measurable features from the samples and compares them to stored templates, has made much progress and there are now many such systems in situ protecting access to physical and logical assets by ensuring that access rights are granted only to authentic individuals and denied to imposters. Image-based biometric systems, which use Fingerprint and Palm patterns, Face and Iris patterns, Hand Geometry and Vein analysis, etc., are all in use or under current development. Dynamic or behavioral biometric systems, which introduce the dimension of time into the sample analysis rely upon the submission of stylus or finger-based Signs or Signatures, Voice or Keystroke patterns and are also being used for similar applications. These latter biometric technologies have several advantages over systems based purely upon physiological imaging technologies. For example, they offer the possibility of user-chosen, secret-based templates preserving privacy, increasing performance and allowing template revocation and replacement in the event of compromise.

One of the major issues in using biometric systems for protecting access to stand-alone computing devices has been the problem of protecting the biometric template from being extracted from the device in the event of its loss or theft. If a password based encryption key is used then system access is again reliant upon the entered password. One of the inherent properties of biometric samples is that successive samples from the same user are never the same, although they might be very similar, especially in the case of image based biometric samples. Consequently the sample can not be used to generate a constant encryption key without some degradation of performance of the overall biometric system.

Methods that attempt to generate keys directly from the biometric sample offer little information on the accuracy they deliver. Examples here are:

Taekyoung Kwon and Jae-I I Lee, "*Practical digital signature generation using biometrics, Computational Science and Its Applications*", LNCS (*Lecture Notes in Computer Science*) Vol. 3043, Springer-Verlag, pp. 728-737, May 2004

C. Soutar, D. Roberge, A. Stoianov, R. Golroy, and B. Vijaya Kumar, "*Biometric Encryption,*" *ICSA Guide to Cryptography*, McGraw-Hill, 1999.

The majority of claims in this invention are based upon the parent application, requiring a transformation of biometric data and use a combination of PIN hash, device ID and a previously selected, obfuscated and de-obuscatable password together with a biometric test as the basis for authentication and key generation. Some claims address authentication and encryption without requiring a transformation of the biometric data and others rely upon the use of more specific signature/sign verification techniques for the biometric function.

One existing method which uses a PIN in conjunction with a biometric sample for protecting access to stand-alone devices is described by Shinzaki in U.S. Pat. No. 6,957,339. This employs a combination of stored PIN (hash), a public/private key pair and the biometric sample whose biometric template is also encrypted using public key encryption methodology. This invention does not require a stored PIN hash, nor does it rely upon the need for a public/private key pair, although it can be used to release the private key in this context. Unlike Shinzaki, this invention makes possible the use of a symmetrical key for both encryption and decryption. However, where the device uses the PKI infrastructure the invention can be used to release/generate the private key.

There have been other attempts to address this thorny problem and examples of reference art are described in:

Scheidt et al—US Publication 2002/0184509. This shows a method of validating a user for access to a system based upon a number of user-provided factors including a user-known key and the user's biometric information, which is encrypted using a key derived from one or more data input instances, including knowledge-based data, possession-based data terminal ID or MAC address. These latter data can be used to decrypt the biometric template. The method does not disclose using a device ID with a PIN hash and a previously selected password to generate an obfuscated password which can be de-obfuscated to provide password-based authentication and data encryption for stored and transmitted data. Nor does it disclose using the obfuscated password with the PIN hash to encrypt and decrypt the biometric template.

Other references of record in this field from Nguyen et al—US Publication 2007/0038863, Gennaro et al—U.S. Pat. No. 6,317,834, Sathath et al—US Publication 2006/0245619 and Talmor et al—US Publication 2003/0135740 all describe methods using a combination of PIN, Device ID and biometric data but none of them combines these with the use of a de-obfuscatable, obfuscated password to provide user authentication and symmetrical encryption keys for template encryption and decryption of stored data and data in transit.

Some of the components of this system, using an earlier, inferior method of transforming the biometric data are also disclosed in U.S. Pat. No. 5,892,824, authored by two of the present inventors.

In the light of this art there is a real need to find a method and system to:

a) Securely authenticate the user to the device by automatically releasing a password to the device authentication system in response to a matched biometric sample and a correct PIN.

b) Authenticate the user and the device to a remote computer or server to provide a trusted stand-alone computer system.

c) Remove the need for the user to remember and enter complex passwords, whilst retaining the benefits of complex password infrastructure and/or PKI for authentication and encryption.

d) Encrypt the biometric template and other data on the device.

e) Automatically generate strong encryption keys for device data and template encryption and to protect secure data communications between the device and the server.

f) Release trusted credentials, including electronic signatures, to provide proof of authorship for transactions and electronic documents Although some of the art references above achieve some of these components, none provides for a comprehensive system containing all of them.

SUMMARY OF THE INVENTION

The method and system described in this Provisional patent application uses a technique for combining a numeric PIN, hardware components of the device and an obfuscated, user-chosen (or imposed) complex, secure password with a biometric sample in a way that provides secure and user-friendly access to these types of devices and also provides for secure template and data encryption, all without the need to remember or enter the password. The method does not rely upon the need for a public/private key pair or the need for the PIN or its one-way hash value to be stored on the device. This secure, user-friendly method releases the required password to the device authentication process or the network authentication process once a correct PIN and biometric sample are submitted and does so without the need for the complex password to be entered or remembered for each transaction. The method further provides the device/user with trusted status to a remote computer. It also allows for server-based interrogation, change & control of the data on the stand-alone devices. Consequently it could open up comprehensive, secure and user-friendly use of mobile devices to enterprises with all the attendant significant security and productivity benefits.

Most devices offer an optional or mandatory power-up password authentication process as part of the operating system to protect access. The present invention harnesses the power-up password authentication process but, instead of requiring entry of the password, it is generated by the device each time after a successful entry/supply of the PIN and a successful submission of a biometric sample on the device. The method first uses a one way hashed value of the PIN combined with a stored value of the obfuscated password (obfuscated using a function of the device hardware components and the PIN hash together with a reversible algorithm) to generate a key to decrypt (and encrypt) the biometric template.

The biometric sample is captured, followed, where required by the PIN, which may be entered by the user (for higher security) or generated by the device software. The features extracted from the biometric sample are provided to the matching process along with the decrypted biometric template. The obfuscated password, a function of the PIN hash, certain hardware components of the device, and the Password itself, are used both in the generation of the template encryption/decryption key and in the generation of the password required by the authentication system to provide access. If there is a good biometric match, the password is generated by de-obfuscating the stored obfuscated Password and passing it to the authentication process. Thus the de-obfuscation process and hence the password release (or the private key release), requires, as well as a successful biometric match, a successful submission of the correct PIN, either from a PIN entry screen, (if required by the owner's security policy) or from the generation of a PIN extracted from the device ID.

The method demands successful submission of the PIN to the system and a good biometric sample, which work together to unlock the device. If the PIN is supplied incorrectly the template decryption key will be wrong and the clear template will be gibberish. If the biometric sample is submitted incorrectly, there will be no match to the template. Both the template encryption/decryption key and the de-obfuscated password are a function of PIN-generated data, supplied on a transaction by transaction basis, as well as hardware components of the individual device and the original chosen (or imposed) password. An imposter would not be able to test first for the correct PIN and then for the correct biometric sample (or vice-versa) since both components must be entered sequentially on each occasion without knowledge of whether either one is correct. Consequently the method provides good protection against brute force attacks. Millions of biometric samples/PIN combinations would have to be submitted to find a correct one and because the biometric sample is required on each occasion this is impractical. Yet the process is still very user friendly since all it requires is the entry of a PIN and a biometric sample or a biometric sample alone. It does not require that the user remember or enter a complex password. The generated password can be used later as the basis for file encryption/decryption on the device, for network communication and encryption where the connecting server knows the password hash and the device ID or for releasing the private key in a PKI-based system. In this manner the device may be recognized as a trusted device by an authentication server or a remote computer and may be extended to cover the case where the device is being used to gain access via a server, to a central data-base. The invention advocates using either a password-based protocol or a biometric data-interchange protocol such as the ANSI BioAPI standard or, alternatively, it can be used in a PKI based authentication/encryption system. Some of the methodology described in this application is described in US Patent Application Publication numbered 20030056100 authored by one of the current inventors and this document is incorporated herein by reference. Some of the concepts described herein can be adapted to the use of an IC (smart) card presented to an IC card reader with an integrated biometric sensor device that might be used, for example at point of sale. Here, biometric feature data generated, by the reader would be captured and compared (using the IC chip processor) to the template stored securely in the IC chip memory. A successful PIN and biometric sample could then release the user's valid signature or some other credential, indicative of end-user authentication, to a remote computer system.

DESCRIPTION OF PREFERRED EMBODIMENTS

In the following description, reference will be made particularly to Signature/Sign biometric data, which may be entered onto the device screen, as may a PIN. It will be very apparent that the biometric modality could be, for instance, instead of signature/sign, a fingerprint using a fingerprint sensor, a facial image, using a device camera or an iris image using an iris camera on the device, or indeed any other image based biometric data generated on the device from a suitable sensor.

Figure 1A:
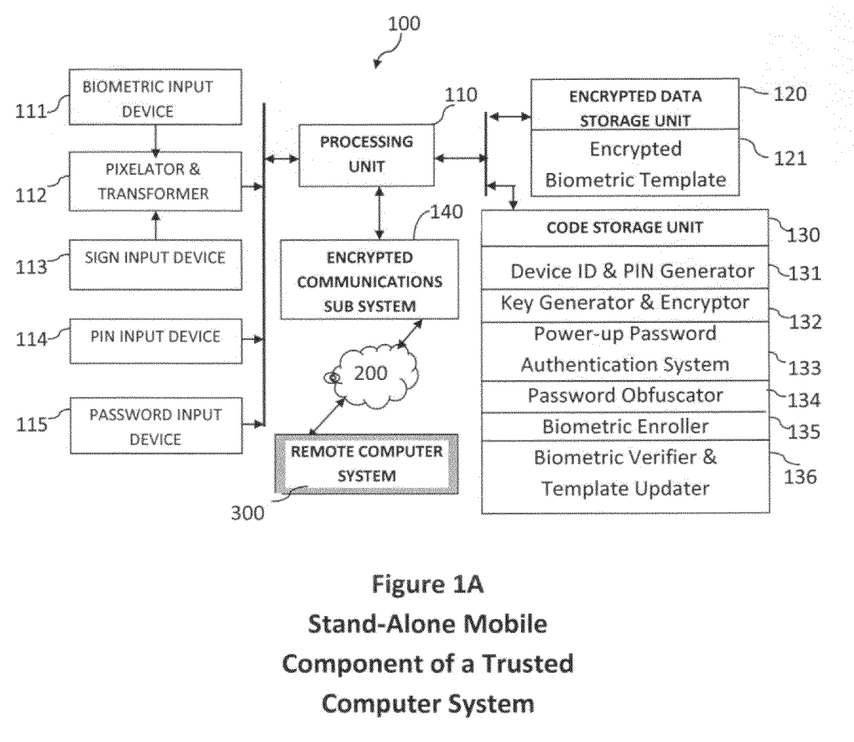
FIG. 1A is a schematic block diagram of an exemplary stand-alone mobile system configuration connected to a Remote Computer System for carrying out aspects of the present invention.

Referring now to FIG. 1A, there is shown an exemplary mobile system configuration in simplified form for implementing the present invention. It is to be understood that the unit components illustrated may be activated by the processor using appropriate software code and stored data. The system 100 illustrated in FIG. 1A incorporates a Processing Unit 11.0 and various input devices—111, 113, 114 and 115. The Biometric Input Device 111 could be a fingerprint sensor, an iris camera or a face camera or another biometric device integrated into the mobile system. It could also be the Sign Input Device (113) used to capture a signature/sign biometric sample or to capture an electronic signature of the mobile system user. Any biometric data captured by the biometric input devices will be pixelated and transformed by the Pixelator & Transformer software (112). The pixel image data points are transformed to a consistent angle of inclination by the Transformer software. The PIN Input Device (114) will provide PIN input where required and the Password Input Device (115) will provide Password input where required. The mobile system further contains an Encrypted Data Storage unit (120) and, in particular, a stored Encrypted Biometric Template of the device owner (121). The mobile system also contains a Code Storage Unit (130) which contains appropriate software functionality modules (131,132,133,134,135 and 136). These modules will operate to implement the method described later for; providing secure access to the device using a combination of PIN and biometric sample without the need to remember or enter a Password; providing for stored data to be encrypted and for providing a key generation and encryption capability for secure Encrypted Communications Subsystem 140. The Encrypted Communications System 140 will provide a secure link, via the public or private network system 200, to the Remote Computer System or Server 300, which could also be contained within the Cloud Network System 200, as opposed to existing as a separate physical entity outside the Cloud.

Figure 1B:
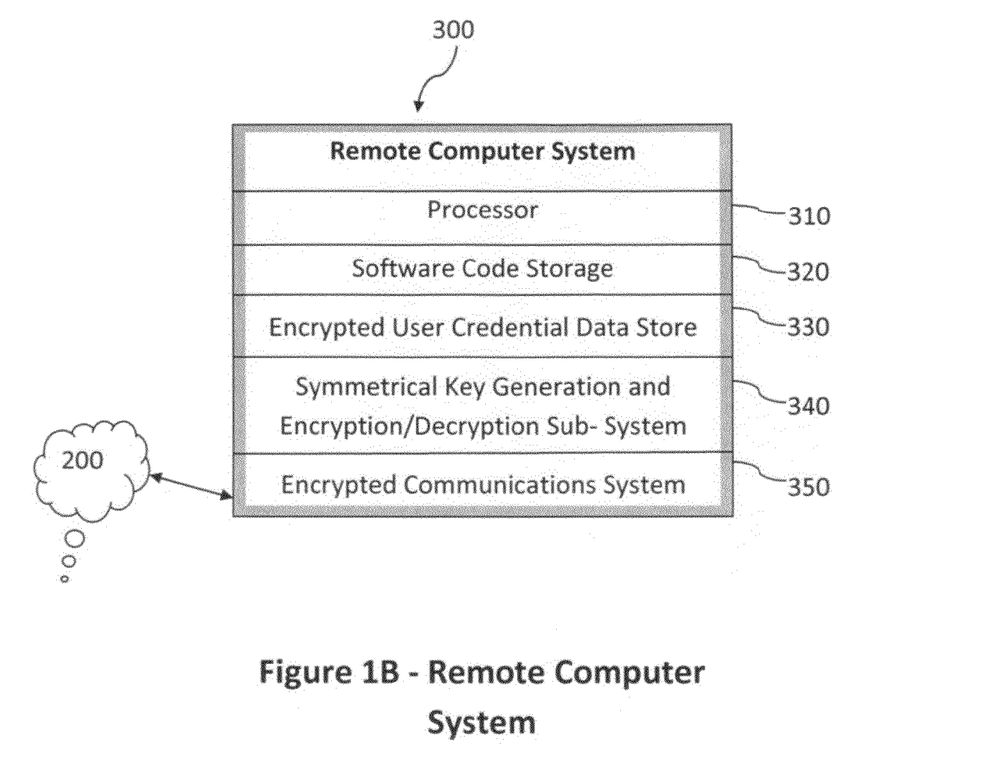
FIG. 1B is a schematic block diagram of the components of an exemplary remote computer system for carrying out aspects of the present invention.

Turning now to FIG. 1B, the Remote Computer System 300 will incorporate several subsystems with the following functions:

310—A Processor
   320—A Software Code Storage Unit
   330—An Encrypted User Credential Data Store
   340—A symmetrical Key Generation and Encryption/Decryption Sub-System
   350—An Encrypted Communications Sub-System These subsystems will operate in a manner, described later to provide a trusted link to the standalone mobile device.

Again referring to FIG. 1A, in an exemplary system, the biometric data from the sensor is pixilated (box 112) and will be transformed to a consistent angle of inclination by applying a quadratic equation in 1) a ratio of X,Y variances of pixel positions and 2) a covariance of pixel positions in the X and Y planes such that the resulting transformed (x,y) coordinates are invariant to the original angle of submission of the biometric sample. Following this the transformed data will be further rotated based upon applying a rotation calculated from the tangent of a line of regression calculated on the rotated data. Although the system may choose to use one or the other of two possible quadratic equations for the initial rotation, the equation chosen in this exemplary system defines the transformation angle through which to rotate the original X,Y axes as $\tan^{-1}(M)$, where:

$M=[2ra+ \text{ or } - \text{Sqrt}(4r^2a^2+a^4-2a^2+1)]/(a^2-1)$ if a is not equal to 1, and where $a=\text{Sqrt}[V(X)/V(Y)]$ with V(X) and V(Y) being the well known definitions of the variance of the (X,Y) pixel positions and where r is the well known definition of the correlation coefficient of the (X,Y) pixel positions.

Where a approximates 1, the value of |M| becomes very large and for this reason it is advisable to limit the value. A value of 10,000 works relatively well.

Although both the positive and the negative square roots of the equation will achieve the desired effect, they will provide different rotation solutions. There is no particular advantage to choosing one over the other and the negative square root option will be assumed. This rotation will always transform the original (X,Y) pixel positions to a consistent angle of inclination with respect to the rotated (x,y) axes. The transformed (x,y) data may then be further rotated through an angle calculated as the angle between a line of regression through the (x,y) data and the x axis. The resulting image might then be more representative of a natural angle of submission and is also corrected for skew. The line of regression of choice may be that derived by minimizing the sum of the squared perpendicular distances from the (x,y) points to the line of regression and this is achieved by solving the equation:

$2m^3 - m^2(2r_1+1) + 2m(r_1+1) - (2r_1+1) = 0$, where m is the tangent of the angle between the line of regression and the x axis and $r_1$ is the correlation coefficient of the (x,y) data and can be calculated as:

$$r_1 = [M(1-a^2) + (1-M^2)ra]/[a^2 + 2mra + M^2]$$

The combined rotational transformation angle can then be calculated from the original X,Y data by the well-known equation:

$$M_1 = (M+m)/(1-Mm).$$

The final transformation may then be calculated by applying the following transformation to the original X,Y axes to generate the finally transformed (x,y) data from the original (X,Y) data:

$x = X \cos w + Y \sin w$
$y = Y \cos w - X \sin w$
where $\tan w = M_1$

This transformation has a very significant beneficial effect on the consistency of feature extraction thereafter and leads to a significantly higher performance biometric system, with lower False Reject and False Accept rates The biometric data will then be used in a manner later described to provide the elements of this invention. An exemplary system will now be described within the context of the Signature/Sign modality but understanding that a similar system could be developed using any biometric device integrated within the stand-alone mobile system. It will show how, as well as providing for a secure, trusted and user-friendly authentication system, that an authentic signature can be released to an electronic document and that it can be used for extremely accurate matching with the same valid signature stored remotely in encrypted form.

Once a device is trusted, or can release trusted data, it may be used in many different applications. In particular it can be used to release an electronic representation of a user's authentic electronic signature which can be appended to an electronic document to give the signature an ink-on-paper look. The authentic electronic signature can then be compared to that stored in a remote computer file containing user credentials (subsystem 330 of system 300) and the match should be exact, or at least very close. In order to accomplish this, the biometric template is designed to house the electronic signature itself, as well as biometric feature data. Since the valid signature is always stored with the template it is always stored on the device in encrypted form and communicated in encrypted form.

Figure 2A:
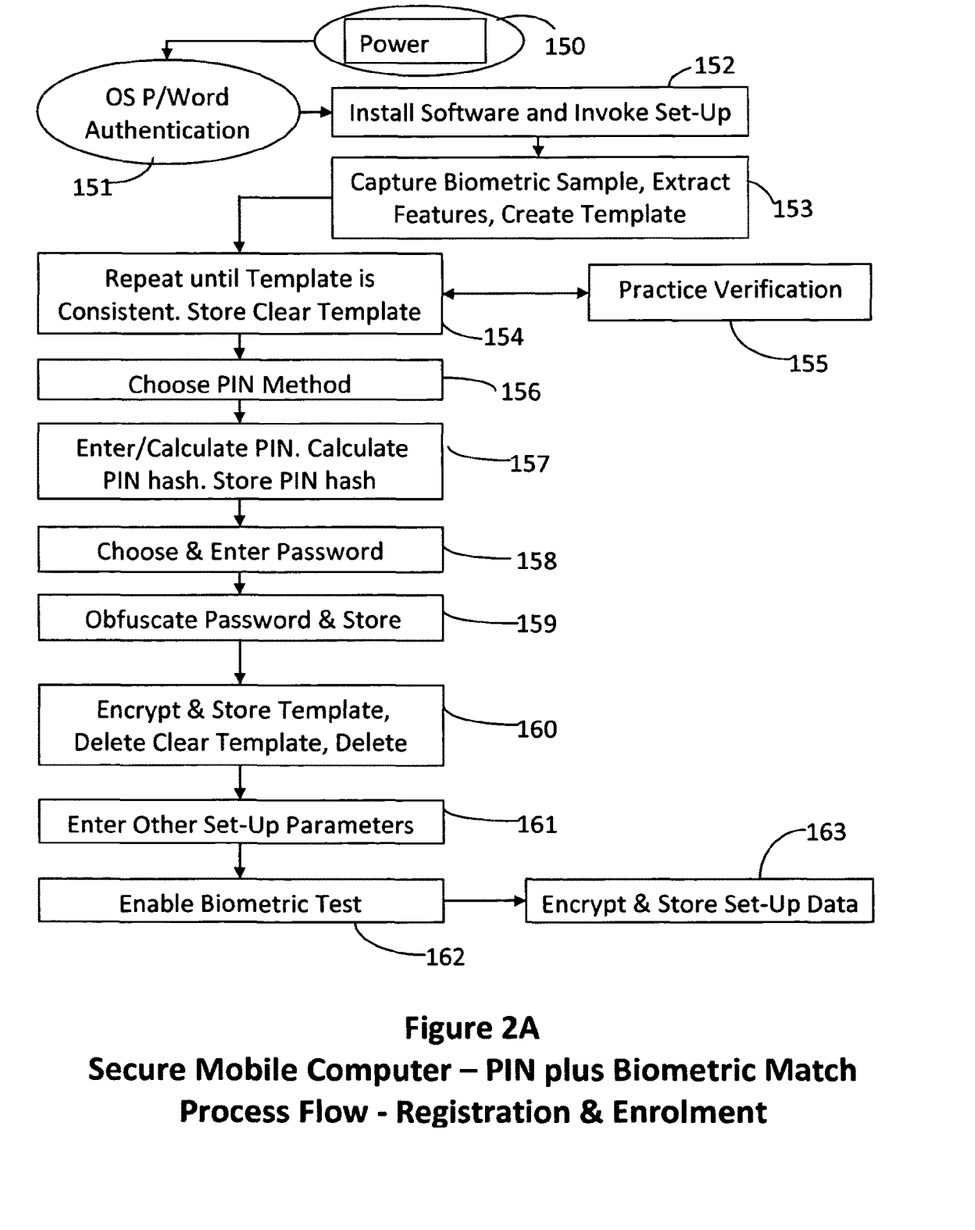
FIG. 2A is a flow diagram of the method where the stand-alone mobile system is operating purely in local mode to install the software, register/enroll the user and enter appropriate set-up data to carry out aspects of the present invention.

Turning now to FIG. 2A, the stand-alone mobile computing device 100 is used to register and enroll the user and to set appropriate parameters of the system. After Power-Up (150), the device will implement its normal Password Authentication system (151) to allow the user to operate the device normally. The user/owner will now install the authentication software and commence the set-up process (152). The user is prompted first to enroll his biometric template on the device (153 and 154) by submitting a number of separate biometric samples. The software determines when enough enrollment samples have been submitted. The detailed method in a Signature/Sign context is described later. At this stage the user may practice verification by submitting samples against the enrolled template until (s)he is comfortable with the process (155). The user then chooses whether to require PIN entry or PIN generation as described later (156). The PIN is then entered or generated and the one-way PIN hash is calculated and stored temporarily (157). The user then enters a chosen or imposed password which may be as complex as is required for the appropriate level of encryption security (158). The password is then obfuscated as described later and stored on the device (159). The Template is then encrypted (160) using a generated key as described later. The user then enters other set-up parameters (161) and enables the biometric test (162). The set-up parameters are then stored in encrypted form (163). The set-up parameters will be decrypted and reinitialized by the device when it is next powered up (Box 171 in FIG. 2B).

Figure 2B:
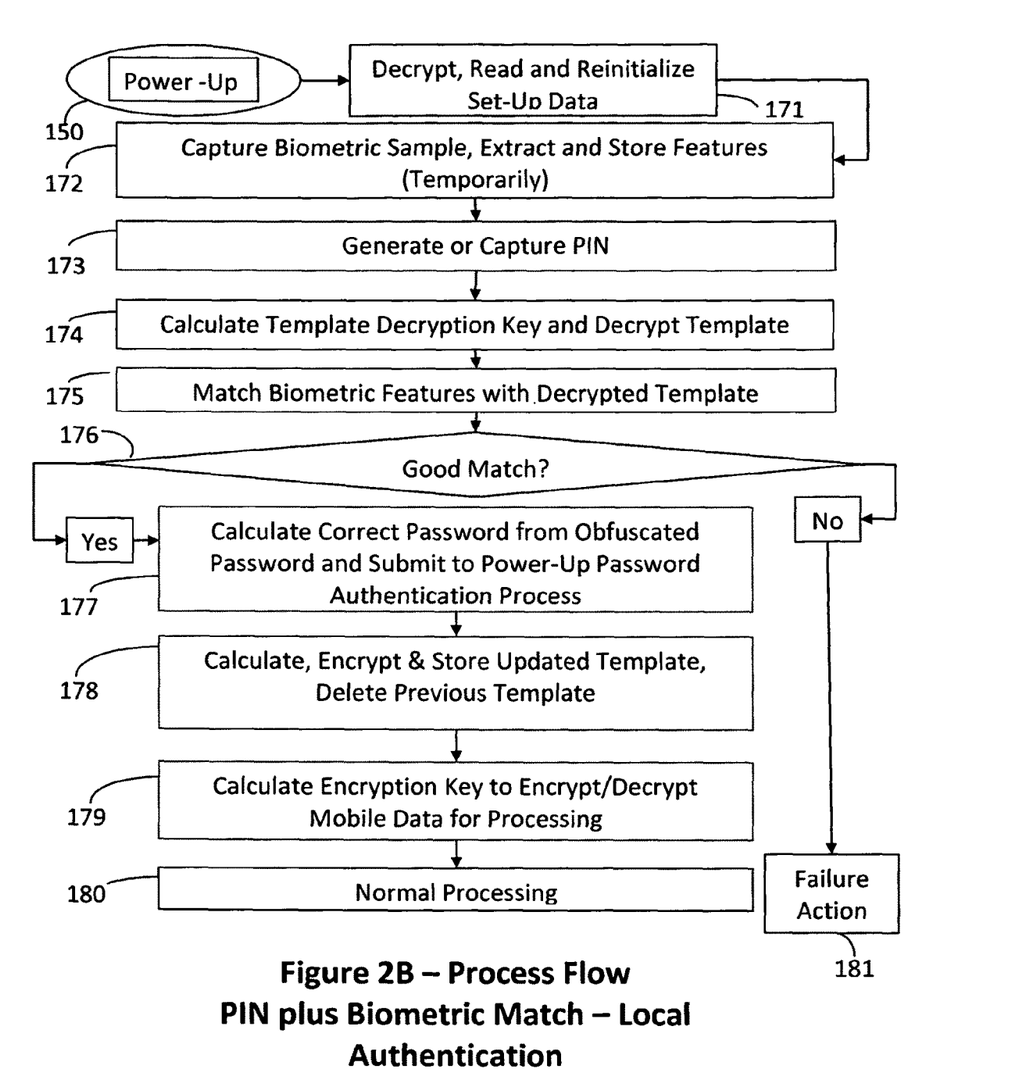
FIG. 2B is a flow diagram of the method used to authenticate the user to the stand-alone mobile device, including the generation of encryption keys for template and data encryption.

Turning now to FIG. 2B, we see the system flow when the invention is used for local authentication to protect access to the stand alone device and to encrypt the device data and the biometric template. After Power-Up (150) the set-up data is decrypted, using a key described later, and reinitialized (171) prior to capturing the biometric sample, pixelating, transforming and extracting the biometric features (172). During this process, certain feature values—those not dependent upon the angle of submission—will be calculated. After the sample has been fully captured (controlled by a time-out mechanism) the in-contact X,Y pixel positions will be transformed to rotate the pixels to a consistent angle of inclination as described earlier. After the biometric sample has been captured, pixilated and transformed, the PIN is either entered or generated (173) according to a method to be described later. Following this, the system flow follows boxes 174 (key generation and template decryption) to produce a clear text template and perform the template/feature matching process in boxes 175 & 176. These methods will be described in more detail later. Failure to match will result in an appropriate device failure action (box 181) and a successful match continues the operation to boxes 177, 178 and 179 leading to normal processing (box 180). The methods to develop the data described in boxes 177-179 are described later.

Once the user has enrolled his (or her) biometric template and set up the appropriate initial device data, the device may be used in conjunction with a remote computer in a trusted system where the remote computer has, securely stored in encrypted form within it, at least the following user credentials (FIG. 1B, Subsystem 330):— i) The device ID
ii) The User Name
iii) The same one-way hash of the user password that the device uses.

This information is typical of that stored on systems to provide password authentication. In addition the Remote Computer must be capable of suitable key generation and handling encrypted communications between it and the stand-alone device using at least item (iii) above.

Again turning to FIGS. 2A and 2B, we will discuss the definitions of the calculations and actions performed in the various blocks. First, defining the terms:

Let D be an automatically generated numeric device ID used in the password obfuscation and de-obfuscation process (159 and 177).

Let P be the power-up password required by the authentication system—user-chosen or imposed (158)

Let $P_\#$ be a one-way hashed value of the password (used to generate keys for the various encryption/decryption processes (160,163, 174, 178,179)

Let PIN be the user chosen PIN or the generated PIN (156, 157 and 173)

Let $PIN_\#$ be a one-way hashed value of the PIN (157) used in the obfuscation/de-obfuscation process (159 and 177)

Figure 3:
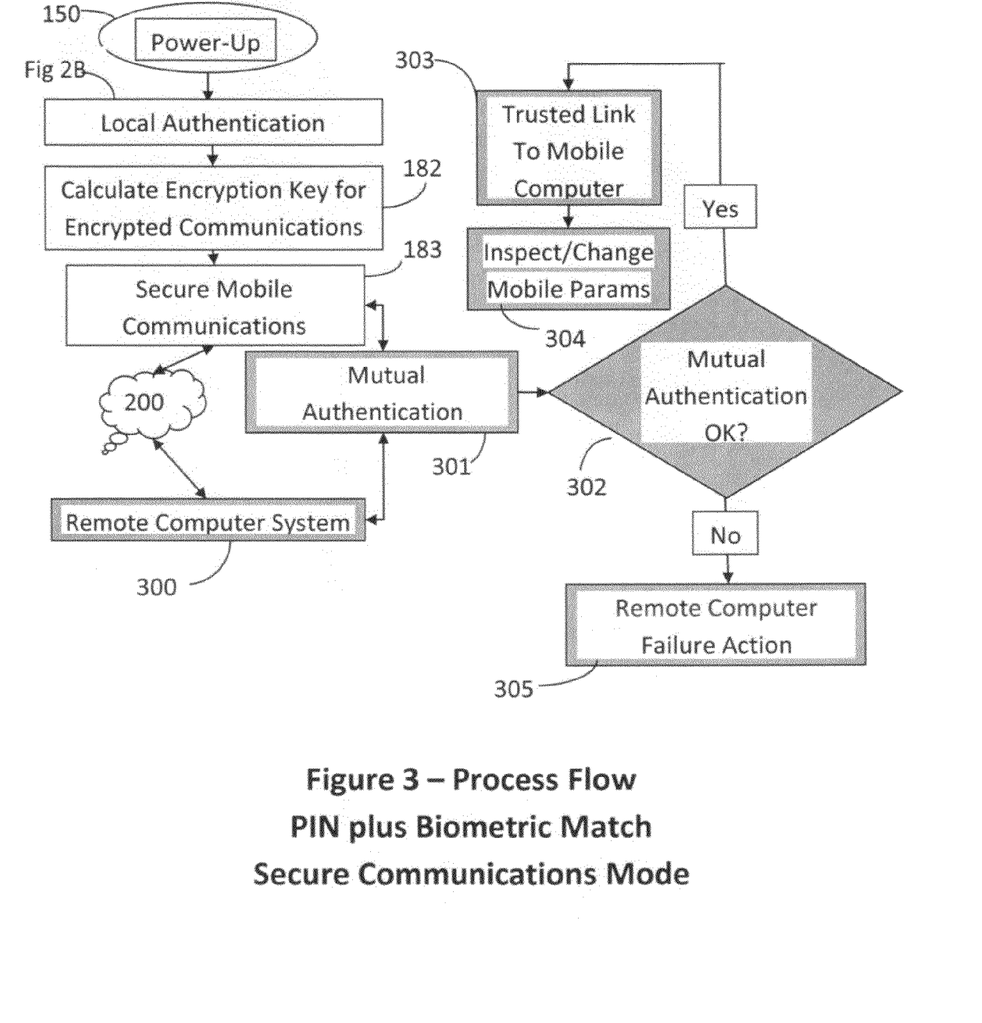
FIG. 3 is a flow diagram of the method where the stand-alone mobile device operates in conjunction with a remote computer system or server on a trusted basis.

Let $P_{Obf}$ be the Obfuscated Password (159) used to calculate the password P to be used in the local and remote password authentication systems (FIG. 2B and FIG. 3).

Let $T_{Clr}$ be the clear text biometric template (153) used to match with the submitted biometric sample features (172, 175,176)

Let $T_{Key}$ be the symmetrical key used to encrypt/decrypt the biometric template (160, 174, 178). The generation method is described later.

Let $T_{Enc}$ be the encrypted biometric template (160, 174, 178) using a symmetric encryption function such as the Advanced Encryption algorithm.

The following methods describe the calculation of the various terms and variables used to implement the invention in this preferred embodiment. We will first choose a function $f_1$ such that:

$f_1(D,P,PIN_\#)=P_{Obf}$ and
$f_1^{-1}(D,PIN_\#,P_{Obf})=P$

We then choose a second function $f_2$ such that:
$f_2(P_{Obf},PIN_\#)=T_{Key}$

It is clear that there are many functions which obey these properties It is not the purpose of this specification to describe the exact function. There follows an example, using some values generated from these type of functions to show how the process works.

In generating D, the numeric Device ID used in the obfuscation and de-obfuscation processes 159 and 177, one could use a function of the network access card address (MAC address) or Volume ID of a mobile computer, or the UUID of a PDA/Cell phone to generate the Device ID and there are developing standards which specify how this might be done in an internet context to give many levels of identification to a computer generated message or document which includes the device ID. See for example, ISO/IEC 11578: 1996 "Information Technology—Open Systems Interconnection—Remote Procedure Call (RPC)" and ISO/IEC FDIS 9834-800. The IETF has also published a Proposed Remote Control Call (RFC) standard For this example we will proceed as follows:
i) Let us assume that D is generated from a set of 12 Hex.Values (typical of the MAC card address) e.g. 9BDF135702F6.
ii) Convert this to a numeric value by substituting the ASCII decimal codes for each character. This would give D=576668704951535548507054

In Calculating the Obfuscated Password $P_{Obf}$ (159) for use in authentication and encryption/decryption, blocks (160,171,174,177,178 and 179) from P, D and $PIN_\#$, we might define $f_1$ in the following manner:

i) Assume a complex password (less than, say 32 characters?) has been chosen or imposed. It might be something like: ! Space "$+. ~}{?R>4 n
ii) Convert each character to its ASCII code and subtract from 128 retaining two numeric digits for each character (e.g. 5 would be denoted as 05)—call the result $P_{nt}$ (Password Numeric Transform)
iii) Generate D and capture or generate a Dummy PIN—see v) below
iv) Apply a one-way hash function to the PIN generating (say) a 128 bit digest. Split this into 32 Hex characters and convert to a 64-digit numeric value by substituting the two-integer ASCII decimal codes for each Hex character. This is $PIN_\#$.
v) In the case where no PIN entry is required, in order to retain program structure, we define a generated Dummy PIN value by choosing 4 of the Device ID digits. There are many, many permutations of 4 (or more) from 24 and the system implementation will provide a customizable module to provide the generated PIN and changes on a required basis.
vi) Add together the values for D, $P_{nt}$ and $PIN_\#$ and store this set of numeric digits securely as the obfuscated password=$P_{Obf}$ $P_{Obf}$ is set and stored on the device at registration/biometric enrollment when the Password and PIN are set up. $P_{Obf}$ will change if the PIN or the Password is changed. Changing the PIN or Password, or indeed the biometric template, will require submission of the old PIN and a successful biometric sample against the old template. It will not require user input of the old Password which can be automatically generated by the system from the stored obfuscated password and the PIN hash.

Note that if $P_{Obf}$ is exposed to an attacker, the information is of no direct use. Even if the password is exposed, the only way to provide it to the authentication system is by the submission of a matching biometric sample and a correct PIN using a sensor on the actual device.

In calculating the Template Encryption/Decryption Key $T_{Key}$ (160,174 and 178) we define a function $f_2$ such that $T_{Key}=f_2(P_{Obf}, PIN_\#)$. Suppose we generate $T_{Key}$ by choosing $f_2$ as the sum of $P_{Obf}$ and $PIN_\#$ using the 128 least significant bits. The key is generated each time the template is encrypted or decrypted and never stored other than temporarily. The key for encrypting/decrypting the Set-up Data (171) which may be accessed by the system prior to the submission of the PIN and biometric sample is always generated using the generated PIN and $P_{Obf}$.

In generating the Password (for authentication or encryption) by de-obfuscation of the obfuscated password we apply the inverse function of $f=f^1$ in the following manner:

i) Get $P_{Obf}$
ii) Generate D
iii) Capture PIN (or supply Dummy PIN) and generate $PIN_\#$
iv) Subtract the sum of D and $PIN_\#$ from $P_{Obf}$
v) Subtract each successive set of two digits from 128. This is $P_{nt}$ and represents the ASCII decimal codes for the Password P to be passed to the authentication process only if the biometric matching is good.

Turning now to FIG. 3, we see the process flow and calculations for creating a trusted relationship between the owner of the mobile device and a remote computer. The remote computer (300) will require the elements in FIG. 1B and the system flow will again start at mobile device power-up in box 150 of FIG. 3. Following this the device/user first completes the local authentication procedure (FIG. 2B). Then after calculating the encryption key for secure communications (box 182) and enabling secure communications (box 183), mutual authentication (301) may be requested by the device, based upon its desire to communicate with the remote computer, or it may be requested by the remote computer (300) based upon Enterprise Security policy. Either way this is followed by the mutual authentication procedure and test (301 & 302)

This procedure is accomplished as follows: remote computer or server 300 knows $P_\#$ and Device ID (D). Device user enters the PIN/Biometric sample as necessary to authenticate to the mobile device according to FIG. 2B. Device generates D and $P_\#$, which it uses to generate the encryption key (182) as a pre-determined function of $P_\#$ (and possibly D). It then encrypts D and Username and sends to server. Server decrypts after generating the same encryption key and encryption function as the device used and checks that D is a legitimate device ID for the user. Responsive to this check (box 302) server acknowledges trusted device status to device using the same encryption key to protect communications. This encryption key can also be used for on-device file encryption.

Thereafter, (303), the server will assign trusted status to device 100 and may be authorized by the device to change the mobile device parameter data according to enterprise security policy (304). If the device does not respond to the server's request for mutual authentication, or if the user cannot authenticate to the device or if the device is not a legitimate ID, the server will undertake failure action (box 305) and this could be as extreme as deleting all data from the mobile device.

As an alternative approach to the password-based encryption protocol described above, Server/Device Authentication and Control may be achieved using the ANSI standards, CBEFF and BioAPI In this method, box 301 would operate as follows after a request by the device or server for mutual authentication:

i) Server instructs user to authenticate to server.

ii) User authenticates to device and sends encrypted biometric data as specified in one of the ANSII or ISO/IEC standard biometric data exchange formats using the ISO/IEC BioAPI standard interface or another CBEFF patron. The encryption key, based on $P_\#$, will be generated by the device in the same manner as previously. The BioAPI data will contain, as part of its Payload, the encrypted values of D and UserName.

The Server will decrypt D, UserName and the biometric data using the same key ($P_s$) as described previously and perform a biometric match with the template data stored upon the server in the encrypted User Credential Data Store (330). Responsive to this match (302), if D is a legitimate device ID for the user and the match is good, access to the network is granted (303) and, if required by the biometric system, the server will update the biometric template from the BioAPI data sent to it from the device. If the match is not good or if the D is not a legitimate device the server will initiate failure action (box 305).

Referring again to FIGS. 2A and 2B, appropriate treatment of Signature/Sign biometric data is described below.

1) Template Building (blocks 153-155 and 178)

In an exemplary system of the present invention the template is built by software from users' signs shortly after they are submitted. The software will extract biometric features from the sign data after allocating a time value to each (X,Y) coordinate value. In the current invention, the electronic sign verification software will:

a) Transform the (x,y,t) values to (x,y,t) in the manner previously described and extract m features of the (x,y,t) data, $(f_1 \ldots f_m)$ in a manner later described.

b) Compare these values with the template stored on the device or transmit the values, suitably encrypted through the network to an authentication server.

The device software will, for the first N signs, calculate and store the mean value for each of the features calculated so that if $f_{1j}$ is the $j^{th}$ value of feature 1 from the $j^{th}$ sign for a specific customer, then—: Mean $f_{1j}=Mf_{1j}$ would be calculated as follows:

$Mf_{11}$ after 1 sign=$f_{11}$
  $Mf_{12}$ after 2 signs is $((1-a)*Mf_{11}+a*f_{12})$
  $Mf_{13}$ after 3 signs is $((1-a)*Mf_{12}+a*f_{13})$ ... etc.
  Where:
  for the second sign a=0.5
  for the third sign a=0.33
  for the $4^{th}$ sign a=0.25 ... etc
  for the $n^{th}$ sign a=1/n until n=9. Thereafter a=0.1 for all signs.

$Mf_2 \ldots Mf_m$ will be calculated in a similar manner.

The device software will also calculate and store the mean difference of the feature values from their means as each new sign is submitted in the following manner.

If the mean difference for feature 1 after j−1 signs is $D_{1,j-1}$, then:

$D_{1j}=a*Abs(f_{ij}-Mf_{j-1})+(1-a)*Abs(D_{ij-1})$ where a has the values:
  for the second sign a=0.5
  for the third sign a=0.33
  for the $4^{th}$ sign a=0.25 ... etc.
  for the $n^{th}$ sign a=1/n until n=9. Thereafter a=0.1 for all signs.

$Df_2 \ldots Df_n$, will be calculated in a similar manner.

As each new sign is added, after the first two, a compatibility test may be applied to the M values to determine if they are consistent with the previous M and D values and if not that sign may be eliminated. The new mean estimates (M) of feature values and their differences (D) will be stored as the feature template values for that feature and will be used in the matching calculation.

The signature/sign template may also contain an electronic copy of the user's authentic signature, which can be released in encrypted form, in response to a local biometric match, to a remote computer system that would compare it to an identical electronic copy stored in encrypted form on its system. The authentic electronic signature would consist of the (x,y) values only and would be a constant data set in the template until changed by the user. Release of this authentic electronic signature to a remote computer could be used to accurately and remotely authenticate the author of an electronic document or transaction e.g a credit card transaction or other financial transaction.

After the system starts to match each new sign with its template values the mean and mean differences will be updated in the same way after each good match. Before (or after) successful enrolment the user may record an electronic version of his valid signature in the form of a vector image to be stored in the template and to be released, where required, responsive to a good biometric test. Such an electronic signature would be unchanged for each release so that any match of it against previous or future authentic signatures released in the same manner would be exact or at least, very close.

How large should N be? In some systems where signs are submitted carefully, matching can take place after as few as three signs. However, some signs may take more samples to define the template and this is controlled by a consistency test and/or a parameter of the system.

2) Feature Matching

Suppose that, for a particular sign the value of feature i is $f_i$.

Suppose the template values for feature i are $M_1$ and $D_1$

We calculate a mismatch score sum=S=Sum[$w_i$*(Abs($f_i$−$M_i$)/$D_i$)] for i=1 . . . m, where there are m feature values being measured.

This can be compared against a threshold value $T_m$ to generate a match or a mismatch. The template values (M and D) would be updated for a match and not for a mismatch. There are a number of different ways to calculate mismatch distance measurements and we encompass them generally in this example.

3) Calculating $T_m$

There are m features with discriminant weightings ($w_1$ . . . $w_m$), such that Sum($w_i$)=m, and they contribute to the mismatch score in the following manner so $T_m$ can be set as follows:

$T_m$=Sum($w_i$)+p*sqrt(Sum($w_1^2$))—where p is a parameter used to set the security level. The lower the value of p, the more secure is the system and vice versa. The higher the value of p, the more benign is the system and vice versa.

4) Feature Selection

In an exemplary system we envisage the features being selected using functions of the (x,y,t) data as described below:

a. V(x), where V(x) is the variance of the x-coordinate values of the transformed sign.

b. V(y) where V(y) is the variance of the y-coordinate values of said transformed sign.

c. C(x,y) where C(x,y) is the covariance of the transformed sign coordinate values d. Total sign time.

e. Total in-contact sign time f. Total out-of contact sign time g. Positions of (x,y) turning points with respect to time h. Positions of (x,y) turning points with respect to x-position i. Positions of (x,y) turning points with respect to y-position j. An estimate of total x-distance traveled.

k. An estimate of total y-distance traveled l. (x,y) positions of new points of stylus contact with respect to time.

m. New out-of-contact stylus (x,y) positions with respect to x-position.

n. (x,y) positions of new points of stylus contact with respect to x-position o. (x,y) positions of new out-of-contact stylus positions with respect to time p. Forehand (x,y) distances q. Backhand (x,y) distances Forehand movements of the stylus/finger are defined when the x movement and the y movement are either both positive or both negative. Backhand movements of the stylus/finger are defined when the x movement is positive and the y movement negative, or vice-versa.

To arrive at an efficient feature set and weights ($w_i$) that discriminate powerfully between authentic signs and fraudulent signs the inventors advocate the method defined in a White Paper authored by Rodney Beatson—one of the present inventors—entitled "Feature Selection & Definition in a Biometric System with Many Possible Features Including Multi-Modal Features" dated Feb. 8, 2010 and incorporated herein by reference.

The sign verification method described in this invention is given extra strength by the sign verification accuracy observed in a limited experiment conducted on behalf of the INCITS Biometrics M1 committee. The sign data captured in this experiment was later subjected to the analysis described above in the White Paper with impressive results.

What is claimed is:

1. A stand-alone computing device comprising:
   a processor;
   a memory;
   a biometric sensor; and
   software storage, wherein upon an initial device power-up, executing the software stored thereon, causes the processor to:
      generate a device ID from characteristics of device hardware components;
      prompt a user to submit a plurality of biometric samples and capture said plurality of biometric samples using said biometric sensor;
      transform data of said captured biometric samples to a consistent angle of inclination;
      biometrically enroll an identity of a device user by matching said transformed data of said captured biometric samples to each other and determining a biometric template;
      obtain a PIN value by one of a) generating said PIN value from said device ID and b) capturing said PIN value after being entered on the device;
      generate a one-way hashed value of said PIN;
      accept a password from the user after obtaining said PIN;
      obfuscate the password using said hashed value of said PIN and said device ID, and storing the obfuscated password in said memory;
      generate a private encryption key using at least said obfuscated password and said hashed PIN;
      encrypt said biometric template using said private encryption key and store the encrypted template in the memory; and
   upon subsequent device power up, the software further causes the processor to:
      capture a subsequent biometric sample from a user, using said biometric sensor;
      decrypt the encrypted template using said private encryption key;
      de-obfuscate the obfuscated password using said hashed value of said PIN; and
      provide the de-obfuscated password for an authentication process, only if the decrypted template is correctly decrypted and said subsequent biometric sample matches said decrypted template.

2. The device of claim 1, wherein said device is connected, through a network to a remote computer and said device and said remote computer achieving mutual remote computer/device authentication by:
   a) the remote computer being configured to request an active device user to authenticate the device using said subsequent biometric sample and said PIN;
   b) said device being configured to generate a one-way hash value of said de-obfuscated password provided for authentication;
   c) said device being configured to communicate encrypted data, including a user credential over said network, using a symmetrical encryption key, which is a function of at least one of the one-way hashed value of said provided de-obfuscated password and said device ID;
   d) said device being configured to further communicate at least said device ID, encrypted with said symmetrical encryption key, to said remote computer;

e) the remote computer being configured to calculate said symmetrical encryption key from a stored value of the hashed password, decrypts at least said device ID, and authenticates the device as a legitimate device on said network;
f) the remote computer being configured to acknowledge the legitimacy of said network communication by encrypting the hashed password using said calculated symmetrical key and communicates the encrypted hashed password to said device,
g) said device being configured to decrypt said encrypted hashed password, tests the decrypted hashed password for authenticity and in response to said test, acknowledges remote computer legitimacy to remote computer and grants it full access to said device;
h) the remote computer being configured to check said device for compliance with network security policy and may change parameter data for acceptability and, if appropriate, releases said user credential to remote computer applications, and
i) the remote computer being configured to delete all data from the device when the device does not respond to said remote computer request.

3. The device of claim 1, wherein said device is connected, through a network to a remote computer, said device and said remote computer achieving mutual remote computer/device authentication by:
   a) the remote computer being configured to request an active device user to authenticate the device using said subsequent biometric sample and said PIN;
   b) the device being configured to generate said de-obfuscated password which is used to release a Private Key to implement a PKI encryption and authentication protocol between the device and the said remote computer, only after successful submission of said subsequent biometric sample and PIN,
   c) the remote computer being configured to gain full access to said device and modify said device according to enterprise security policy when the device does not respond to said remote computer request.

4. The device of claim 1, wherein the said biometric sensor comprises one of a stylus-based screen entry digitizer and a finger-based screen entry digitizer and records sign input.

5. The device in claim 4, wherein said biometric samples contain, at least (X,Y) coordinate values, wherein each set of co-ordinate values having one of an associated explicit and inferred time stamp;
   said biometric template is adaptive,
   the device being configured to calculate, store, and update biometric features, biometric feature means, and biometric feature variances, wherein said biometric feature means are modified by choosing weights that correspond to a largest discrimination score measured between authentic and imposter samples; and
   the device being configured to prompt a user to choose said signs to be one of: a secret sign without user feedback and a signature with user feedback.

6. The device of claim 5, wherein said biometric feature means are based on at least one of:
   V(x), where V(x) is variance of the x-coordinate values of a transformed sign, V(y), where V(y) is variance of the y-coordinate values of a transformed sign, C(x,y), where C(x,y) is covariance of a transformed sign coordinate values, total sign time, total in-contact sign time, total out-of contact sign time, positions of (x,y) turning points with respect to time, positions of (x,y) turning points with respect to x-position, positions of (x,y) turning points with respect to y-position. an estimate of total x-distance traveled, an estimate of total y-distance traveled, (x,y) positions of new points of stylus contact with respect to time, new out-of-contact stylus (x,y) positions with respect to x-position, (x,y) positions of new points of stylus contact with respect to x-position, (x,y) positions of new out-of-contact stylus positions with respect to time, Forehand (x,y) distances, and Backhand (x,y) distances.

7. The device of claim 1, wherein
   said biometric template contains an electronic representation of the user's valid signature which is released to electronic documents requiring it, said electronic documents subsequently being communicated to a remote computer storing a valid signature for said user, which is used to check the authenticity of the said electronic representation of user's valid signature, requiring an exact or very close match;
   said biometric template includes a time-stamp associated with the last time it was used to match a biometric sample;
   said biometric template includes an authentication code which is a definitive function of at least data defining said template
   said biometric template contains the number of samples contributing to its values.

8. The device of claim 1, further comprising an integrated IC card reader and wherein a user credential is released in the following manner:
   a) said biometric template and a user credential are stored on an IC card;
   b) the PIN and subsequent biometric sample matching to the decrypted template processes are undertaken on the IC card; and
   c) in response to a correct PIN and biometric sample match, said user credential is released to be compared to information stored on a remote computer.

9. A stand-alone computing device comprising:
   a processor;
   a memory; and
   a software storage, wherein execution of the software causes the processor to:
      biometrically enroll device users, by capturing biometric samples, wherein said biometric samples contain, at least, (X, Y) coordinate values, and each set of co-ordinate values having one of an associated explicit and inferred time stamp;
      extract biometric feature values from signs made on an electronic signing area of said computing device, by one of a stylus and a finger, wherein said signs are chosen by the user to be one of, a secret sign without user feedback and a signature with user feedback;
      verify the identity of a user by matching a new biometric sample with a previously enrolled biometric template, wherein said biometric template includes an electronic representation of said user's authentic signature and said authentic electronic signature is released for comparison with an electronic signature stored on a second computer remote from the stand alone computing device;
      calculate means of biometric features and modifying the means by weights that correspond to a largest discrimination score measured between authentic and imposter samples;
      generate a password and password hash from a stored, de-obfuscated password and device ID, wherein the de-obfuscated password is generated following a PIN generation and biometric sample matching.

10. The device of claim 9, wherein said device is connected, through a network to a remote computer and said device and said remote computer achieving mutual remote computer/device authentication by:
a) the remote computer being configured to request an active device user to authenticate the device for mutual device authentication;
b) said device being configured to communicate encrypted data over said network using a symmetrical encryption key, which is a function of the hashed value of said password;
c) said device being configured to communicate at least said device ID, encrypted with said symmetrical encryption key, to said remote computer;
d) the remote computer being configured to calculate said symmetrical encryption key, decrypts at least said device ID, and authenticates the device as a legitimate device on said network;
e) the remote computer being configured to acknowledge the legitimacy of said network communication by encrypting one of said hashed password and other known data using said symmetrical key and communicates the encrypted one to said device;
f) said device being configured to check the value of one of said hashed password and said other known data and in response to said check, acknowledges remote computer legitimacy to remote computer and grants it full access to said device;
g) the remote computer being configured to check said device for compliance with network security policy and may change device parameter data for acceptability and, if appropriate, releases a trusted credential; and
h) the remote computer being configured to delete all data from the device when the device does not respond to said remote computer request.

11. The device of claim 9, wherein said device is connected, through a network to a remote computer, said device and said remote computer achieving mutual remote computer/device authentication by:
a) the remote computer being configured to request an active device user to authenticate the device using said subsequent biometric sample and said PIN;
b) the device being configured to generate said de-obfuscated password which is used to release a Private Key to implement a PKI encryption and authentication protocol between the device and the said remote computer, only after successful submission of a subsequent biometric sample and PIN,
c) the remote computer being configured to gain full access to said device and modify said device according to enterprise security policy when the device does not respond to said remote computer request.

12. A mobile device comprising:
a processor;
a memory;
a biometric sensor integrated into the mobile device; and
software storage embodying software that when executed cause the processor to:
generate a device ID from characteristics of hardware components of said device;
capture a biometric sample from a device user using said biometric sensor;
perform authentication with a remote computer using PKI communications and a private encryption key,
wherein said private encryption key is generated as a function of a previously entered password and said device ID;
said software further causing the processor to perform encryption using at least said private encryption key;
said memory storing a biometric template, which is encrypted and decrypted using said private encryption key;
wherein said mobile device is unlocked, in response to a good match between said biometric sample and said decrypted biometric template, and accessed by PKI communications software, without said user re-entering a PIN or password for device access or for remote computer authentication.

13. The mobile device of claim 12, wherein said memory stores an electronic representation of said user's authentic electronic signature which, in response to a satisfactory biometric match of said biometric sample with said biometric template, is released in encrypted form for comparison with a very close replica of said electronic signature stored remotely on a separate computer.

14. The mobile device of claim 12, wherein said device and said device user authenticate to a remote computer using a CBEFF patron such as ANSI BioAPI and where the BioAPI payload includes at least said device ID encrypted with said private encryption key.

15. A mobile device comprising:
a processor;
a memory;
a biometric sensor integrated into the mobile device; and
software storage embodying software that when executed cause the processor to:
generate a device ID from characteristics of hardware components of said device;
capture a biometric sample from a device user using said biometric sensor;
prompt the user to enter a PIN, which is subjected to a one-way hash function, wherein the hashed PIN is used in conjunction with said device ID and a previously entered password to generate a private encryption key;
perform authentication with a remote computer using PKI communications and said private encryption key;
said software further causing the processor to perform encryption using at least said private encryption key;
said memory storing a biometric template, which is encrypted and decrypted using said private key;
wherein said mobile device is unlocked, in response to a good match between said biometric sample and said decrypted biometric template, and accessed by PKI communications software, without said user re-entering a password for device access or for remote computer authentication.

16. The mobile device of claim 15, wherein said memory stores an electronic representation of said user's authentic electronic signature which, in response to a satisfactory biometric match of said biometric sample with said biometric template, is released in encrypted form for comparison with a very close replica of said electronic signature stored remotely on a separate computer.

17. The mobile device of claim 15, wherein said device and said device user authenticate to a remote computer using a CBEFF patron such as ANSI BioAPI and where the BioAPI payload includes at least said device ID encrypted with said private encryption key.

* * * * *